United States Patent
Koh

(10) Patent No.: US 10,601,968 B1
(45) Date of Patent: Mar. 24, 2020

(54) FOLDABLE WEDGE-SHAPED MOBILE ELECTRONIC DEVICE

(71) Applicant: Wei Hu Koh, Irvine, CA (US)

(72) Inventor: Wei Hu Koh, Irvine, CA (US)

( * ) Notice: Subject to any disclaimer, the term of this patent is extended or adjusted under 35 U.S.C. 154(b) by 6 days.

(21) Appl. No.: 16/205,117

(22) Filed: Nov. 29, 2018

(51) Int. Cl.
*H04M 1/02* (2006.01)
*G06F 1/16* (2006.01)

(52) U.S. Cl.
CPC ........ *H04M 1/0222* (2013.01); *G06F 1/1618* (2013.01); *G06F 1/1652* (2013.01); *G06F 1/1681* (2013.01); *H04M 1/0262* (2013.01); *H04M 1/0264* (2013.01); *H04M 1/0268* (2013.01); *H04M 1/0277* (2013.01)

(58) Field of Classification Search
CPC ............ H04M 1/0222; H04M 1/0268; H04M 1/0262; H04M 1/0264; H04M 1/0277; G06F 1/1618; G06F 1/1681; G06F 1/1652

See application file for complete search history.

(56) References Cited

U.S. PATENT DOCUMENTS

| | | | | |
|---|---|---|---|---|
| 5,283,862 A * | 2/1994 | Lund | ........................ | G06F 1/162 345/173 |
| 6,392,880 B1 * | 5/2002 | Forlenza | ................ | G06F 1/1616 361/679.37 |
| 6,404,623 B1 * | 6/2002 | Koshika | ................. | G06F 1/1616 345/87 |
| 8,493,726 B2 * | 7/2013 | Visser | ................... | G06F 1/1601 361/679.3 |
| 8,665,236 B2 * | 3/2014 | Myers | ................. | H04M 1/0268 345/173 |
| 8,767,394 B1 * | 7/2014 | Hamburgen | .......... | G06F 1/1626 345/905 |
| 9,307,061 B2 * | 4/2016 | Nikula | ................... | G06F 1/1626 |
| 9,395,544 B2 * | 7/2016 | Luttmann | .......... | G02B 27/0172 |
| 10,274,995 B2 * | 4/2019 | Seo | ........................ | G06F 1/1643 |
| 10,466,748 B2 * | 11/2019 | Choi | ..................... | G09G 3/3266 |
| 2012/0106047 A1 * | 5/2012 | Chu | ........................ | G06F 1/166 361/679.01 |
| 2015/0055285 A1 * | 2/2015 | Zheng | ................... | G06F 1/1656 361/679.26 |
| 2015/0277496 A1 * | 10/2015 | Reeves | ................. | G06F 1/1652 345/1.2 |
| 2016/0054756 A1 * | 2/2016 | Lan | ...................... | G03B 21/145 353/101 |

* cited by examiner

Primary Examiner — Jinhee J Lee
Assistant Examiner — Theron S Milliser

(57) ABSTRACT

A mobile electronic smartphone device having a wedge-shaped body comprised of a curved and slanted display gradually tapered towards the thin end, and a thick head section comprised of a battery compartment and a modular, rotatable or replaceable camera module. The display may be rigid LCD, OLED, microLED with a rigid glass cover. Optionally, flexible, bendable display with stretch-rigid circuit backing and flexible cover screen may be used for a foldable or rollable device, comprised of a bending hinge located at or below the mid-section of the display body, wherein the thinner display section is bendable against the thicker section of the front display. Another embodiment of the wedge body is comprised of rollable housing slats and a flexible display in the lower half thinner display section that can be rolled up like a scroll or lie-flat against the thicker part of the device body.

12 Claims, 7 Drawing Sheets

FOLDABLE WEDGE-SHAPED MOBILE ELECTRONIC DEVICE

This application claims the benefit of provisional patent application No. 62/737,037, filed Sep. 26, 2018, which is incorporated hereby by reference herein in its entirety.

BACKGROUND

This relates generally to handheld mobile electronic devices such as smartphones and tablets having a touch-sensitive display screen for displaying information and controlling operational functions.

The most desirable physical features of handheld smartphone and tablet devices are thinner body thickness, larger display area, longer battery life, and ease of handling and carrying.

Most of present smartphone and tablet devices are comprised of various rectangular-shaped blocks topped with a flat, planar touch panel display. All functional components including the main circuit board, sensors and power supply are cramped underneath the display, inside the body of the rectangular housing. To make the device thinner, the battery inside is forced to be thin and sometimes even in an odd shape to accommodate other functional components and the circuit board. For ease of carrying, some devices have been designed to be foldable like a wallet to reduce the planar surface area occupied by the device. For such devices with a uniform body thickness, a single fold along one body hinge may more than double the folded body thickness when there is a gap, or clearance space, between the two folded sections or at the bending area. A flat display further may reflect incoming lights that can disturb viewing. A thin, flat rectangular device also needs a back-stand or support to be able to stand sideways. What is desirable therefore is a device that avoids the above-mentioned deficiencies of a flat, rectangular shaped device, allowing more and better display with less reflection, longer-lasting battery, be able to stand sideways on its own, and when folded, without more than doubling the total device body thickness.

Furthermore, with the desire to have a larger display, mobile hand-held devices body and sizes have become bigger and bigger, causing strains and injury to users' hand and fingers when repeatedly working on the touchscreen. This is particularly bad for females and persons with smaller hands and shorter fingers. The average woman's hand is about one inch smaller than the average man's, according to a 2015 study published in Australasian Piano Pedagogy Conference. There is therefore a need for more ergonomic handheld devices for females and people with smaller hands.

SUMMARY

A wedge-shaped, handheld electronic device such as a smartphone or tablet, comprised of a tapered body housing having a slanted display screen that can be either flat or concavely curved. The "head" section of the device thicker end has a first portion, a battery compartment for insertion of a thick, high-capacity removable battery pack as the power supply, and a second portion for attachment to a rotatable turret compartment containing a high-performance camera module with high-performance, complex multiple lenses system such as wide-angle lens, telephoto lens, and zoom lens that require more depth, hence more thickness. The camera module is connected to the second portion of the thick head section by means of suitable universal joint and electrical contacts that permit rotation from the front to the back. Optionally, in another embodiment for the thick head section, the camera module can be a removable and exchangeable modular unit with necessary insertion connector(s) such that different types of camera modules may be inserted or removed.

The device display screen is on the front surface of the tapered housing that is an integral and extended portion of the thick head section. The housing thickness is reduced gradually and smoothly towards the thinnest end edge. Inside the tapered housing compartment section, the main circuit board containing APU, CPU, Memory and other necessary functional components and sensors, connectors, etc., is concentrated on a thin printed circuit board or a thin substrate that is located towards the thicker end, next to the thick head compartments. By selectively concentrating larger internal components toward the thicker section of the tapered body underneath the display screen, the device body thinner end may be free of thick components and circuit board. As a result, the thinner portion of the body is comprised of only the thin display (including cover) and its housing.

The display screen is thus slanted at an angle from the thick end towards the thin end. A preferred embodiment for the display is a smooth, concavely curved screen along the long-axis of the device body for ease of viewing, less reflection, and easier to handle and hold. However, since curved display screens typically cost more to make, it is optionally to have a low-cost version for the wedge-shaped device having a flat display, slanted from the thick head section toward the thin end edge. The housing still has a straight, flat backside. Yet a third embodiment for the rigid device body is having both the display screen and its housing in a concave curved shape.

In another embodiment, the device housing is made foldable by having a bending hinge located, preferably, at a length between one-third and one-half from the thin end bottom edge. When folded inwardly, the lower half of the thin display would cover either part or all of the remaining display area. For instance, if the housing hinge is located one-third distance from the bottom edge, the folded display portion would cover the middle one-third of the display area, but the top one-third display area near the thick head section still remains visible. Using appropriate control software or Apps, useful display information such as phone number, time, and temperature, etc. may be shown only on the remaining exposed, visible screen for continued function when folded.

In yet another embodiment of a foldable device, the display is extended to the lower half of the housing backside. After an inward folding, the housing backside of the thin, lower portion would be flipped to the front side against the front display. With a second smaller display on the housing backside, it now is flipped to the front side and can be functional even when the original front display is now fully covered.

Because the camera on the thick head section is not covered by the folded screen, it can still perform picture or video-taking, using either the uncovered portion of the original front display, or, for the double-screened embodiment, using the backside screen, now facing the front, to show images while taking photos or video. Other messaging and keypad/calling functions also remain functional while the device is folded.

Further, because only the thinner body portion is folded against the tapered mid-section, the overall device thickness after folding can remain less, in height, than the thickest head section, by means of using a tight hinge with a narrow, small clearance. As a result, the folded device is shorter in body length but its overall thickness would double like a folded planar rectangular device, only the thinner tail section is folded to make the folded device resembling more like a smaller, rectangular-shaped device.

While handling the device, the most reasonable and nature location to grab it is the mid-section of the display housing, just below the head section. Hence, the top battery and camera compartment section may have the freedom to be a lot thicker than a typical flat rectangular device. This section can be 1.5×, 2×, or even 3× thick, with 2× thicker being preferred. For example, most flat, rectangular smartphones have typical body thickness of between 5 mm to 10 mm. For the tapered device, the thick head section may be between 10 to 20, or even 25 mm thick. With such kind of depth and space available, a thick, prismatic lithium-ion cell battery pack that provides more power density and higher energy capacity, or a cylindrical cell battery pack may be used. The battery pack may be inserted into the top housing compartment from one side, and inside the battery compartment there can be spring-loaded battery terminal contacts. When the battery insertion door is opened, the battery inside may be popped out slightly, pushed by the compressed spring battery contacts, for easy removal of the battery. Furthermore, this thick power-supply compartment may be used optionally to house fuel cell cartridges for devices that use fuel cell pack as the power supply.

In a preferred embodiment, the thick head battery housing compartment is an integral part of the tapered device housing and occupies only one portion of the head section. The other part of the head section is reserved for a camera module housing unit. Such unit can be a rotatable turret, linked to the device body housing by suitable mechanical and electrical connections to permitting rotation movements. The mechanical attachment may use a universal joint, and electrical connections are by flexible cables and connectors through the joint.

Alternatively, the camera module unit can be a removable and exchangeable modular unit that is inserted to the head section housing by means of proper insertion connector(s).

With the device having a thick head on end and a curved edge along the rest of the housing body, it is possible to place the device sideways and allow it to stand up on its side by itself without the need for a support, such as a built-in kickstand that flips out from the backside of the housing. Thus, viewing in the portrait mode on a table or other suitable surfaces is made possible.

Another embodiment of the tapered device is to make the upper, thicker portion of the tapered housing rigid, while the thinner portion of the housing body be comprised of a series of rollable, connected and sealed slats, with a flexible screen on top. Because this thinner section of body comprises mainly of the flexible display and its sectional housing, this portion of the device body may be rolled up from the thin tail end, like a half-extended scroll. The housing material in this rollable section may be comprised of sections of narrow metal or plastic slats, linked and sealed together by a flexible film or stretch-rigid circuit fabrics such that the entire housing remained tightly sealed and impermeable to dust, moisture, and water. The upper, thicker end of the housing unit may be made with similar metal, glass, or plastic materials With the device having a gradually tapered body and its screen curved inward concavely, the entire device is ergonomically friendlier for holding and maneuver by hands that are smaller, compared to a large, flat rectangular device, especially for female and persons with smaller palm sizes or shorter fingers. Typing and touch control using one thumb can be much easier. This device is therefore more gender-friendly for females. Further, when the thin-end tail is folded, the device body length is reduced substantially for ease of carrying, either by bare hand, inside a pocket or a small purse.

BRIEF DESCRIPTION OF THE DRAWINGS

FIG. 4 contains three separate figures illustrating a tapered device having a concave curved display with a hinged body housing.

DETAILED DESCRIPTION

Figure 1:
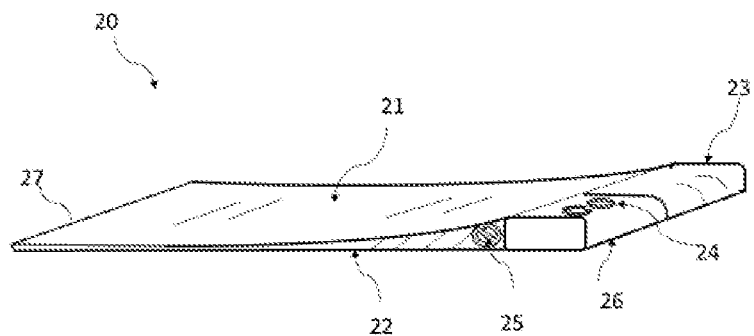
FIG. 1 illustrates a perspective view of the form factor of a tapered device body with a concave screen display from the thin end to the thick head section where a camera module and battery compartment is located. The housing body facing the backside of the device remains flat.

A tapered device 20 with a concavely curved display screen 21 and a tapered housing 22 is shown in FIG. 1 in a perspective view, wherein the thick head section of the device is comprised of a rectangular shaped battery storage housing compartment 23 and a rotatable camera module housing compartment 26. The battery storage housing 23 is an integral part of the tapered housing 22, whereas the camera module housing 26 is attached to the housing unit 22 by means of suitable universal joining connectors and flexible electrical connectors or cables, allowing the digital camera module inside the housing and its external lenses 24 to rotate 90 degrees to face the edge side, or 180 degrees to face the device backside.

Because the thickest "head" section is comprised of the battery compartment 23 and the camera module housing 26, this thick section with more depth allows insertion of a thicker battery pack in compartment 23 and a thicker camera module unit with complicated lens systems 24 in compartment 26, as compared to a typical thin, flat, rectangular-shaped device. The battery packed can be either thick, prismatic cells or cylindrical cells in a rectangular pack having thickness much thicker than the tapered housing body area 22. Thus, the battery pack can have a much higher capacity compared to a thin battery typically used in a thin, flat device, providing more power for longer use before recharge. With more depth available, the camera module inside the housing 26 may use more sophisticated lens systems such as telephoto, wide angle, or zoom lenses for better quality photography. Using a rotatable turret for the housing 26 further eliminates the need for two cameras, one for the front and one for the back.

A connecting port 25 is shown located on the sidewall of the tapered housing 22 as an illustration. On/off switch, other connecting ports and control buttons (volume, headset, etc., not shown) may be located on both sidewalls of the housing 22, near the thick head section 23 and 26.

The battery housing compartment 23 may have a sealable side door opening (not shown) to allow quick insertion and removal of the battery pack, providing an easy access to the battery pack that permits the battery be quickly removed and replaced without the need to open up the device body housing 22 or the display 21.

Inside of the tapered housing 22, the main circuit board containing functional components such as CPU, memory, other electronic components, sensors, and connectors is located towards the thick head section 23 and 26. Because there is no battery pack inside and more vertical space is available in this area, if necessary, stacked mother-daughter boards may even be applied to reduce the footprint area needed for the circuit boards. By concentrating the boards near the thicker region, the thinner region of housing 22 can be free of circuit board and components. Thereby, its thickness is reduced substantially. Hence, the end edge 27 of the device body housing 22 can be as thin as the display thickness plus the housing thickness. The display can be rigid LCD or microLED, or soft, flexible and curved OLED, AMLED, e-ink, and microLED. The surface of the screen 21 contains touch-sensitive layer and necessary protection layer or glass for touch operation and for scratch protection. The screen 21 is preferably concave-curved along its long-axis, while the housing backside 22 remains flat. The housing 22 material can be thin metal, plastic, glass, ceramic, or composite materials.

The device 20 body dimension can vary. As a handheld device having display screen sizes of 5 inch (diagonal) or greater, the body length can be from 12-16 cm, and the body width, 6-9 cm. The thinnest housing end edge 27 may be preferably 1-2 mm, although it can also be thicker to 3-4 mm, which is still substantially thinner than the opposing thick head sections 23 and 26, with a preferred thickness of between 15-20 mm.

In FIG. 1, the display screen 21 is shown bezel-less, covering the whole curved front surface of the tapered housing 22. It is possible to leave narrow bezels (not shown) around the housing.

Figure 2:
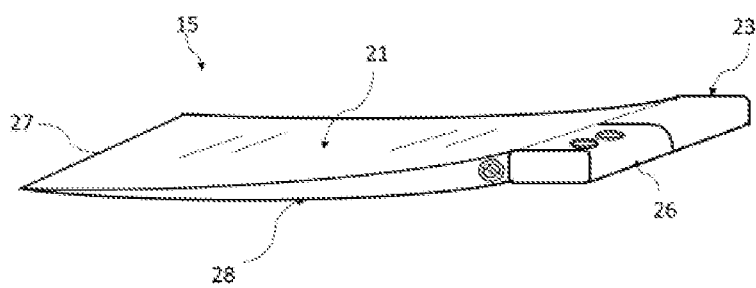
FIG. 2 is another illustration of a tapered device with a tapered concave display screen towards the thin end and a similarly curved housing unit having a curved backside; the thick end section of the device contains a battery compartment and a camera module.

In FIG. 1, the backside of the device tapered housing 22 is straight and flat, so that the entire device body is like a triangular wedge with one curved front display. The thick head compartments 23 and 26 can be rectangular or cylindrical-shaped tubes. The thinner part of the device body allows easier griping with one hand. As an optional embodiment, the tapered housing below the thick head section may also be curved along the long-axis, as shown in FIG. 2, wherein the device 15 housing backside 28 is also curved, following a similar contour of the curved front display 21, while the display 21 is slanted gradually toward the thin end edge 27. As a whole, the device 15 body is tapered from the thick end compartments 23 and 26 toward the thin end edge 27.

Figure 3:
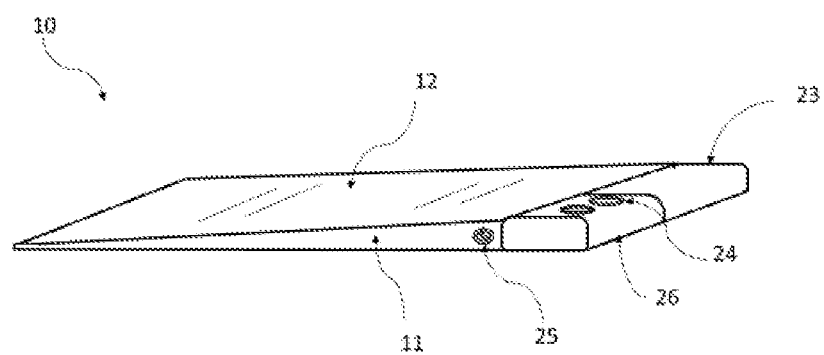
FIG. 3 shows a tapered device having a flat but slanted display screen tapered toward the thin end. The housing backside is also flat.

In FIG. 3, a tapered device 10 is shown. The display 12 is flat instead of being concave; it is also shown bezel-less, covering the entire front surface of the wedge-shaped housing 11. A screen with bezels is still possible and not shown. Other features remain the same as the flat-back device 20 of FIG. 1 and the curved back device 15 of FIG. 2.

In addition to the three variants of rigid-body device types shown in FIGS. 1, 2 and 3, respectively, another embodiment is a foldable device having semi-rigid housing bodies wherein the thinner, lower body can be folded or rolled up. A foldable version is described first in FIGS. 4A through 4C below.

Figure 4A:
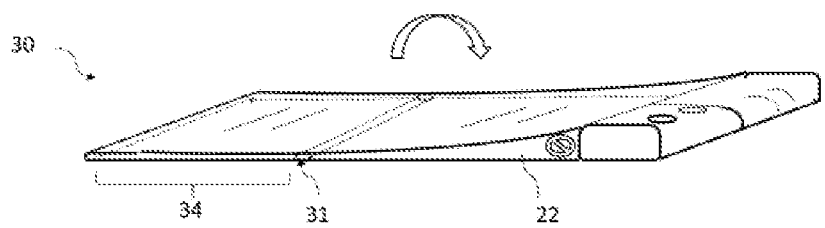
FIG. 4A shows the device in an open, flat position with its housing hinge located near the mid-section of the display.
Figure 4B:
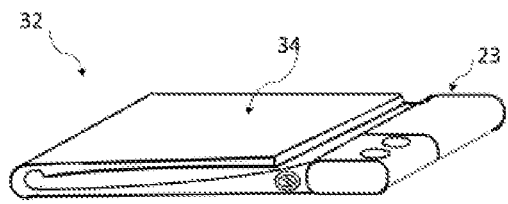
FIG. 4B shows the lower half display in a folded position.

In FIG. 4A, the device 30 has a body hinge 31 located halfway of the display housing 22. After folding at the hinge 31, the lower half 34 covers the top half of the front display, as shown in FIG. 4B, illustrating a folded device 32. Using a tight hinge with very small gap or clearance, the folded device 32 body height can still be below that of the thick head section 23. As shown by a numerical example, the head section 23 is 20 mm thick, and the average height of the folded body section may be only 18-20 mm, turning the folded device 32 body to become more rectangular. With a substantial reduction in body length, the folded device 32 is much easier to be carried around by hand or inside a pocket.

Figure 4C:
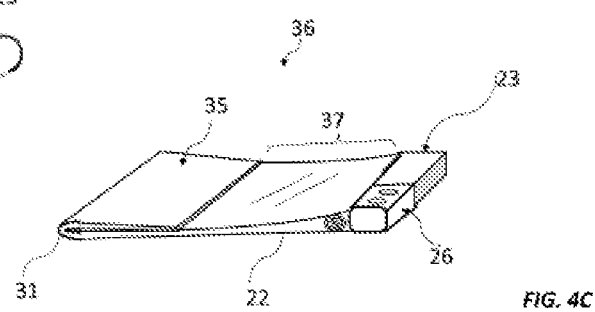
FIG. 4C shows a shorter folded lower section, roughly one-third in length; when folded, the top one-third display is still uncovered and visible.

However, if the backside housing 34 does not display, the folded device 32 would have no more visible display area to show images and contents to permit continued operation. One embodiment to get around this is having the body hinge located at just one-third from the thin end edge such that when folded, the top one third of the original front display still remains visible, as illustrated in FIG. 4C, wherein the body hinge 31 of the folded device 36 is located one-third lengthwise from the thin end edge. After folding, the folded section 35 covers only the middle one-third of the original front display, while the top one-third portion of the front display 37 is still visible and functional, allowing the folded device 36 to continue working as a camera or cellphone. The folding hinge 31 may have a built-in safety stop or spring-loaded pins to prevent the folded section 35 from being squeezed too hard or smashed into the front display screen 37.

The display unit in FIGS. 4A, 4B, and 4C can be made from flexible OLED, miroLED, or other suitable flexible display screens, backed with a thin protective substrate backing and covered with a transparent polymer cover with touch control functions. The display and its supporting housing are therefore bendable.

The camera module 26 in FIGS. 4A, 4B, and 4C can be rotated sideways to face the front, device body side, or the backside. The camera module 26 can also be modular and removable such that different kind of camera systems or other functional modules may be inserted and exchanged using appropriate insertable connector pins and contacts. Connecting ports for charging, headset etc., and control buttons are located on suitable locations along the edges of the main housing body 22, not on the rotating camera module.

For device 32 in FIG. 4B to be operational after folding, another embodiment is adding a second, backside display on the surface of housing 34. This is discussed in details later.

Figure 5:
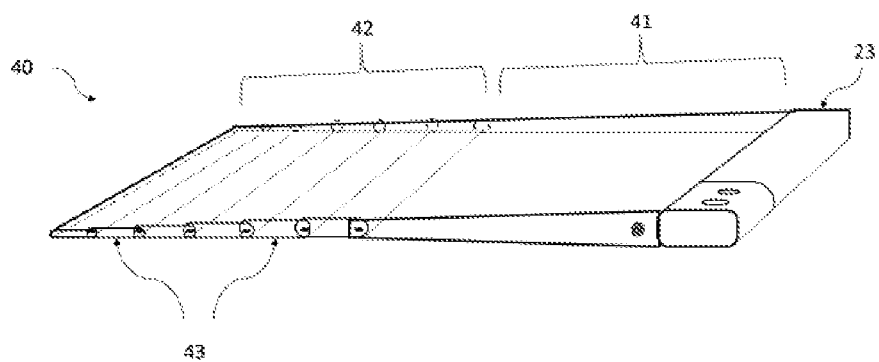
FIG. 5 illustrates a tapered housing having its thinner housing portion comprised of rollable, connected slats.
Figure 6:
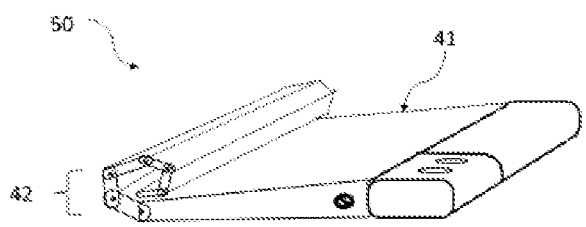
FIG. 6 is a perspective view of a device with the scrolled section after being rolled-up from the tapered thin end.

Another embodiment for a rollable, tapered device is shown in FIG. 5, wherein device 40 lower body has a rollable display 42 and rollable housing 43; the housing being comprised of linked slats that are of connected and sealed with soft lining in-between. The side wall of this rollable section 43 may be riveted and the display screen 42 is flexible. Whereas, the upper section of the display 41 and its housing remains rigid. The lower portion of display 42 may be rolled up like a scroll and rest against the rigid portion 41, as shown in FIG. 6, wherein the rolled-up section 42 may be curled as illustrated, or the slats may be folded and lie flat against the thicker and rigid display 41 (the lie-flat section 42 is not shown.)

The total length of the rollable section 43 in FIG. 5 may be preferably one-third the display screen length, although up to one-half the length is also possible. With one-third length, the lower rollable section 43 can be folded and lie-flat against the mid-section of rigid display portion 41, leaving the top one-third display 41 still visible, thus the device 40 may continue to be operational in either folded or scrolled position. With the optional one-half rollable length, the rollable section in FIG. 6 can be rolled up in scroll position to expose the visible display 41. If folded lie-flat against display 41, the device display will be fully covered and device 50 can remain in "sleep" mode for carrying or resting purpose.

Figure 7A:
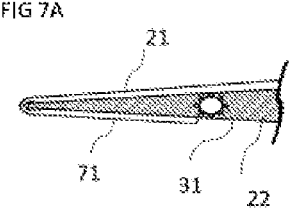
FIG. 7A is a partial, sideview of a wrap-around display extending from the front side to the backside of the device housing; the backside display only covers the backside housing thin end through the housing hinge. The rest of the backside housing is not covered by the backside display.
Figure 7B:
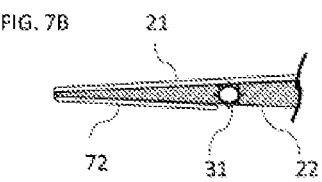
FIG. 7B shows a partial, sideview of a double-display, the device front side has the full-length display, and the backside housing has a second, partially sized display between the thin end section and the bending hinge. The rest of the backside housing is not covered by the second backside display.

For half-folded device 32 in FIG. 4B to continue to show displayed information, two optional embodiments are described in FIG. 7A and FIG. 7B, respectively. The first embodiment, shown by FIG. 7A as a partial sideview of the device lower body, has an extended, wrap-around display 71 that covers the lower one-half of the housing 22 backside. The backside display extension 71 is part of the front side display 21 and ends on the backside of housing 22 at the bending hinge 31. FIG. 7A shows the sideview of this wrap-around arrangement on the thin, lower end part of a folded device. A second embodiment, shown in FIG. 7B, has a second, separate backside display 72 attached to the lower-half surface of backside housing 22, ending at the bending hinge 31. The backside display 72 is independent from the front display 21, however, display contents of both front display 21 and backside display 72 are determined and coordinated by suitable operating software and Apps. When folded, the flipped lower display 71 in FIGS. 7A and 72 in FIG. 7B, respectively, will face the device front and continue to display necessary information such that the device remains functional and operational in a half-folded position.

Figure 8:
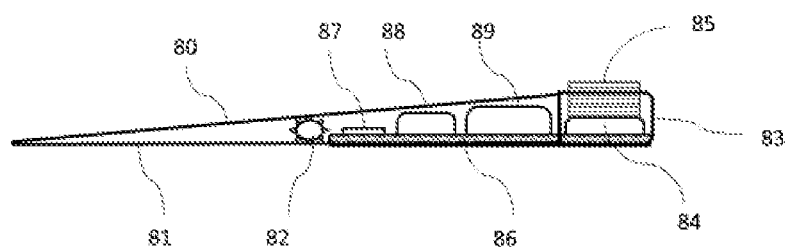
FIG. 8 is a sideview illustration of the component arrangement inside the tapered housing.

The internal component arrangement is illustrated by FIG. 8 to demonstrate that, by selectively arranging thick and larger components 87, 88, and 89 on the thin substrate 86 towards the thicker end of the housing body, the thinner lower section of the tapered housing body 81 below the hinge section 82 is free from thick internal parts, thereby the body thickness is tapered and thinned. The front display 80 is shown as a flat, straight line from the edge view, but the front screen 80 can also be curved as discussed earlier. Inside the head section 83, a camera module 84 and its complex lens system 85 is illustrated.

What is claimed is:

1. A mobile electronic device, comprising:
    a wedge-like tapered housing body having a flat backside and a flat front surface, thinning gradually from a thick head section towards a thin, end edge;
    a display along the long-axis of the tapered housing having a touch-sensitive cover extending from just below the head section to the thin, end edge;
    a display based on LCD, OLED, microLED, or e-ink;
    a thick head section having an insertable battery compartment and a pivoting camera module;
    a functional circuit board underneath the display inside the housing concentrated towards the thick head section, a thinner body housing section comprised of rollable, connected slats that continue the taper near the end edge having no protruded components inside.

2. The electronic device defined in claim 1 further comprising:
    a modular, removable camera module that can be exchanged with other functional modules in the second part of the thick head section.

3. The electronic device defined in claim 1 wherein the front display is bendable, having a flexible touch panel cover, and a bending hinge on the housing body located anywhere between one-fourth and one-half the display length.

4. The electronic device defined in claim 1 wherein the internal functional circuit boards may be stacked in the thicker body portion towards the head section to permit thinning along the thinner end.

5. The electronic device defined in claim 1 wherein the tapered housing is constructed using rigid materials such as metals, plastics, or glasses, except for the hinge section where the housing material is flexible and bendable.

6. The electronic device defined in claim 3 wherein the display housing in the thick area above the hinge is rigid, whereas the housing section below the hinge is rollable and foldable, constructed with thin and narrow metallic or plastic slats hinged together and linked and sealed with flexible lining materials such as polymer film, composite, laminate foil, or stretch-rigid circuits suitable.

7. The electronic device defined in claim 3 wherein the front display wraps around the device thin end edge and extends to the housing backside up to the hinge location.

8. The electronic device defined in claim 7 wherein a first front display covers the front only and a second backside display covering housing backside up to the hinge location.

9. The electronic device defined in claim 3 wherein the bending hinge is comprised of internal locking pins or spring-release clips that prevents the folded part from smashing into the unfolded front display surface.

10. The electronic device defined in claim 1 wherein the device width is between 6 and 9 cm; a total body length between 12 and 18 cm; a varying body thickness between 1 mm and 25 mm.

11. The electronic device defined in claim 3 wherein the device width is between 6 and 10 cm, a total body length between 12 and 18 cm; a varying body thickness between 1 mm and 25 mm.

12. The electronic device defined in claim 3 wherein the overall body height after folding remains equal to or less than that of the device thick head section.

* * * * *